(12) United States Patent
Williams et al.

(10) Patent No.: US 10,167,735 B2
(45) Date of Patent: Jan. 1, 2019

(54) BEARING HOUSING OIL SPRAY GROOVE

(71) Applicant: BorgWarner Inc., Auburn Hills, MI (US)

(72) Inventors: Jonathan Reid Williams, Fletcher, NC (US); Erwin Perry Ellwood, III, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 335 days.

(21) Appl. No.: 15/053,222

(22) Filed: Feb. 25, 2016

(65) Prior Publication Data

US 2017/0248032 A1 Aug. 31, 2017

(51) Int. Cl.
| | | |
|---|---|---|
| F01D 25/16 | (2006.01) | |
| F16C 33/10 | (2006.01) | |
| F02B 37/00 | (2006.01) | |
| F02B 33/40 | (2006.01) | |
| F16C 33/66 | (2006.01) | |
| F01D 25/24 | (2006.01) | |
| F01D 25/18 | (2006.01) | |

(52) U.S. Cl.
CPC ........... *F01D 25/162* (2013.01); *F01D 25/18* (2013.01); *F01D 25/24* (2013.01); *F02B 33/40* (2013.01); *F02B 37/00* (2013.01); *F16C 33/1055* (2013.01); *F16C 33/6659* (2013.01); *F16C 2360/24* (2013.01); *Y02T 10/144* (2013.01)

(58) Field of Classification Search
CPC .............. F16C 33/1025; F16C 33/1045; F16C 33/1065; F16C 33/106; F16C 33/6659; F16C 33/6681; F16C 33/6685; F16C 2360/24; F01D 25/162; F01D 25/18
See application file for complete search history.

(56) References Cited

U.S. PATENT DOCUMENTS

| | | | |
|---|---|---|---|
| 7,476,090 B2 | 1/2009 | Wood | |
| 8,147,181 B2 | 4/2012 | Gee et al. | |
| 8,602,652 B1 | 12/2013 | Bradshaw | |
| 8,727,715 B2 | 5/2014 | Gee et al. | |
| 9,068,473 B2 | 6/2015 | House et al. | |
| 9,068,598 B2 | 6/2015 | House et al. | |
| 9,435,379 B2* | 9/2016 | Iwata | F16C 33/6674 |
| 2013/0108483 A1* | 5/2013 | Becker | F01D 25/166 |
| | | | 417/313 |
| 2014/0369811 A1 | 12/2014 | Malins et al. | |
| 2015/0044037 A1 | 2/2015 | Bucking et al. | |
| 2015/0315932 A1 | 11/2015 | Ryu | |
| 2017/0108035 A1* | 4/2017 | Hinds | F16C 33/107 |

FOREIGN PATENT DOCUMENTS

WO 2014165138 A1 10/2014

* cited by examiner

*Primary Examiner* — James Pilkington
(74) *Attorney, Agent, or Firm* — BrooksGroup

(57) ABSTRACT

A product may be provided for use with a turbocharging system. A housing may be configured to house a bearing. A shaft may extend through the bearing. A turbine wheel may be connected to one end of the shaft. The housing may include a wall forming an opening and defining a surface facing the opening. The bearing may have a segment extending into the opening and mating with the surface. The wall may include an oil spray groove opening through the surface and having an outlet directed at the shaft.

14 Claims, 3 Drawing Sheets

US 10,167,735 B2

BEARING HOUSING OIL SPRAY GROOVE

TECHNICAL FIELD

The field to which the disclosure generally relates may include turbocharging systems for internal combustion engines and in particular, may include turbocharging systems with a bearing housing positioned between a turbine and a compressor.

BACKGROUND

A turbocharging system may include a compressor driven by a turbine. The turbine may be connected to the compressor by a common shaft that may be supported for rotation by bearings. The segment of the shaft supported by the bearings may extend through a bearing housing mounted between the turbine and the compressor. Rotation of the turbine drives the compressor through the common shaft to charge the combustion air intake system of an internal combustion engine.

SUMMARY OF ILLUSTRATIVE VARIATIONS

According to a number of variations, a product may be provided that may be used with a turbocharging system. A housing may be configured to house a bearing. A shaft may extend through the bearing. A turbine wheel may be connected to one end of the shaft. The housing may include a wall forming an opening and may define a surface facing the opening. The bearing may have a segment extending into the opening and mating with the surface. The wall may include an oil spray groove opening through the surface and that may have an outlet directed at the shaft.

A number of other variations may involve a product that may include a housing. A bearing may be disposed in the housing and may define a cylindrical opening. A shaft may extend through the cylindrical opening and may rotate about an axis that defines an axial direction. A turbine wheel may be connected to one end of the shaft. The housing may include a support wall that may extend in the axial direction and that may turn inward toward the axis where it may form a wall opening. The bearing may have a segment that may extend into the wall opening. The wall may include a groove that may be open to the wall opening and may have an outlet that may be directed at the shaft.

Other illustrative variations within the scope of the invention will become apparent from the detailed description provided herein. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
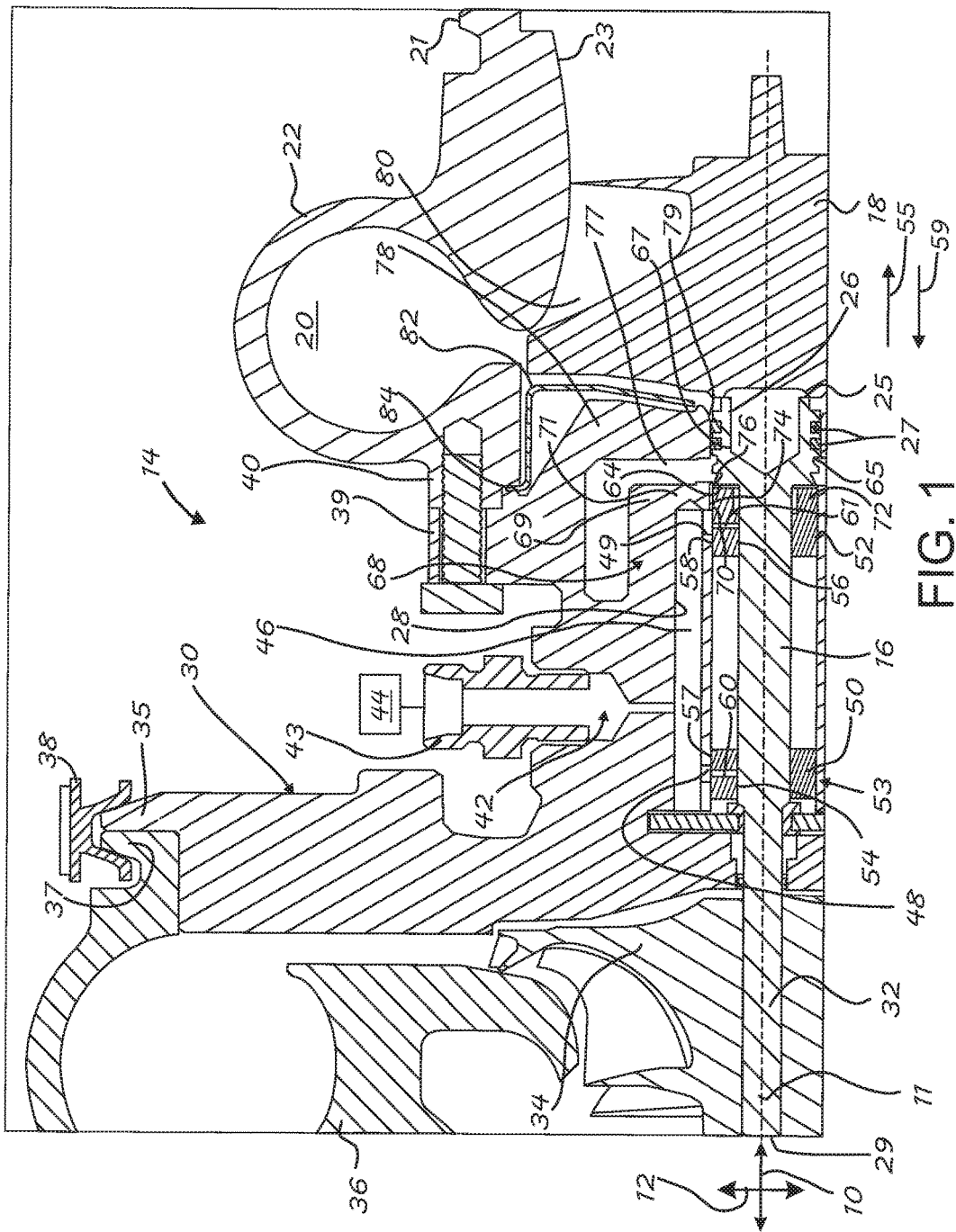
FIG. 1 is a fragmentary cross section illustration of a product for use with a turbocharging system according to a number of variations.

With reference to FIG. 1, a number of elements may be described in relation to an axial direction and a radial direction. In this regard, reference number 10 indicates a reference line that extends in the axial direction, which coincides with left and right in the view of FIG. 1. The line indicating the axial direction 10 is shown coinciding with an axis of rotation 11 of the product 14 along the centerline of a shaft 16. An axial extending part will extend on a line parallel to, or on, the axis of rotation 11. Reference numeral 12 indicates a reference line that extends in the radial direction, which means toward or away from the central axis 11, which is generally vertical as viewed in the two-dimensional depiction in FIG. 1. However, it will be understood that in three dimensions, a radially extending element may extend in any of a number of angles in the 360 degrees that exist in a plane perpendicular to axis of rotation 11, and toward or away from the axis of rotation 11.

In a number of variations, the product 14, may be used with a turbocharging system for an internal combustion engine and may provide a mechanism for dissipating heat. A turbine wheel 18 as shown in FIG. 1 may exist in a continuous high velocity jet of exhaust gases entering through the volute 20 when the engine is running. The volute 20 may be defined as a channel by a turbine housing 22, which may include a flange 21. The flange 21 may be adapted for connection to a downstream exhaust system. Upstream of the turbine wheel 18, exhaust from an associated engine may be channeled through the volute 20 and around the turbine wheel 18 to spin the turbine wheel 18, and may then be exhausted through the port 23.

In a number of variations the turbine wheel 18 may be connected to the shaft 16 at its end 25. The shaft 16 may include an enlarged segment 26 at or near the end 25, which may be referred to as a piston ring boss, and may have a number of annular grooves holding seal rings 27, which may be piston-type seal rings. The shaft 16 may extend in the axial direction 10 along the central axis 11, and through a bearing bore 28 formed in a housing, which may be referred to as a bearing housing 30.

In a number of variations, the shaft 16 may include a reduced segment 32 at or near an end 29 and that may be connected to a compressor wheel 34. The compressor wheel 34 may rotate with the shaft 16 and the turbine wheel 18. The compressor wheel 34 may be disposed to rotate in a compressor housing 36 to compress intake air for an associated engine. The bearing housing 30 may include a flange 35 on the compressor side, which may extend outwardly in the radial direction 12 and may be configured for connection to the compressor housing 36 at a flange 37 thereof. A band clamp 38 may be used to secure the bearing housing 30 to the compressor housing 36. The bearing housing 30 may also have a flange 39 on the turbine side, which may be configured to mate with an annular axially extending wall 40 of the turbine housing 22.

In a number of variations, the bearing housing 30 may define the bearing bore 28, which may extend in the axial direction 10 around the axis of rotation 11. An oil gallery system 42 may be defined in the bearing housing 30, and may be connected to a pressurized lubrication system 44 at a fitting 43. The system 44 may be the pressurized lubrication system of an associated internal combustion engine with which the product 14 may operate, or may be a separate system. The oil gallery system 42 may include a channel 46 that may be formed as a bore that may be parallel with the bearing bore 28, and may be spaced apart therefrom, in the bearing housing 30. A pair of oil ports 48 and 49 may be formed through the bearing housing 30 and may connect the channel 46 with the bearing bore 28. As a result, lubricant entering the oil gallery system 42 at the fitting 43 may pass through the channel 46 and the oil ports 48, 49 and into the bearing bore 28.

In a number of variations the product 14 may include a bearing system 53 for free rotation of the shaft 16 around the axis of rotation 11, which may include a pair of bearings 50 and 52. The bearings 50, 52 may be plain-type or journal bearings. In other variations the bearing system 53 may include rolling element bearings such as ball or roller bearings, or other types of bearing mechanisms such as fluid bearings or magnetic bearings, or combinations of different types of bearing elements. In other variations a different number of bearings may be included. The bearings 50, 52 may be of a hollow cylindrical shape with central cylindrical openings 54, 56, through which the shaft 16 extends. The outer perimeters 57 and 58 of the bearings 50 and 52 respectively, may be seated in the bearing bore 28 against the bearing housing 30. Retaining devices (not shown), such as circlips or other elements may be used to maintain the axial positions of the bearings 50, 52. During operation of the product 14, the bearings 50, 52 may float radially on oil film at the mating area of their cylindrical openings 54, 56 and the shaft 16, and also at the mating area of their outer perimeters 57, 58 and the bearing housing 30. The bearings 50, 52 may have through holes 60 and 61 in the radial direction 12 from their outer perimeters 57, 58 to their cylindrical openings 54, 56, to assist in the flow of oil to their mating surfaces with the shaft 16.

In describing the product 14, a direction toward the turbine wheel 18, and a part of an individual element located toward the turbine wheel 18, may be referred to as a turbine end outboard 55 direction or position as indicated by the reference line labeled 55. The opposite direction away from the turbine wheel 18, and a part of an individual element located away from the turbine wheel 18, may be referred to as a turbine end inboard 59 direction or position as indicated by the reference line 59. In a number of variations the shaft 16 may have a shoulder 64 adjacent or near the enlarged segment 26, which may encircle the shaft 16. On the turbine end outboard 55 side of the shoulder 64, the shaft may define a trough 65 that may extend around the shaft's outer perimeter 67 resulting in an annular shape. The surface of the shaft 16 in the trough 65 may face outward in the radial direction 12 (upward and downward in FIG. 1), and inward in the axial direction 10 (in the turbine end inward 59 direction). The trough 65 may be positioned between the shoulder 64 and the enlarged segment 26 that forms the piston ring boss.

In a number of variations the bearing housing 30 may include a support wall 68 that extends in the axial direction 10 and that turns inward at section 69 toward the axis of rotation 11 where it forms a wall opening 70. The wall opening 70 may be formed by a support wall segment 71 that extends inward in the radial direction 12 from the section 69. The bearing 52 may have a segment 72 extending into the wall opening 70, which may form part of the bearing bore 28. The support wall segment 71 may include a groove 74, which may be an oil spray groove. The groove 74 may be formed through the surface of the support wall 68 forming the wall opening 70, and as such may be open to the wall opening 70. At its end on the turbine end inboard 59 side, the groove 74 may be open to the oil port 49. At its end on the turbine end outboard 55 side, the groove may include an outlet 76 open to a chamber 77 formed in the bearing housing 30. As a result, oil supplied to the bearing bore 28 through the oil gallery system 42 is also supplied through the groove 74 and the outlet 76 to the chamber 77, and may provide cooling therein. The supplied oil may drain downward in the bearing housing 30 and may be returned to the pressurized lubrication system 44.

In a number of variations the bearing housing 30 may include a turbine end wall 78 that extends in the radial direction 12 inward toward the axis of rotation 11. The turbine end wall 78 may be located between the support wall 68 and the turbine wheel 18 and may define an axial opening 79 that may be centered on the axis of rotation 11. The enlarged segment 26 of the shaft 16 may be positioned in the axial opening 79. The enlarged segment 26 may act as a piston ring boss by carrying the pair of piston-type seal rings 27. The seal rings 27 may provide a turbine end seal between the shaft 16 and the bearing housing 30 at the turbine end wall 78 to retain oil in the bearing housing 30, and may be used due to the high temperature conditions at the turbine wheel 18 and the high rotational speeds of the shaft 16.

In a number of variations, a heat shield 82 may have a central opening through which the shaft 16 extends and may have a peripheral rim forming an outer flange 84 configured to be engaged between the turbine housing 22 and the bearing housing 30. The heat shield 82 may be formed generally in a cup shape that opens toward the bearing housing 30. The heat shield 82 may shield the turbine end wall 78 from the direct heat of the exhaust gases in the exhaust channel area 80 around turbine wheel 18.

Figure 2:
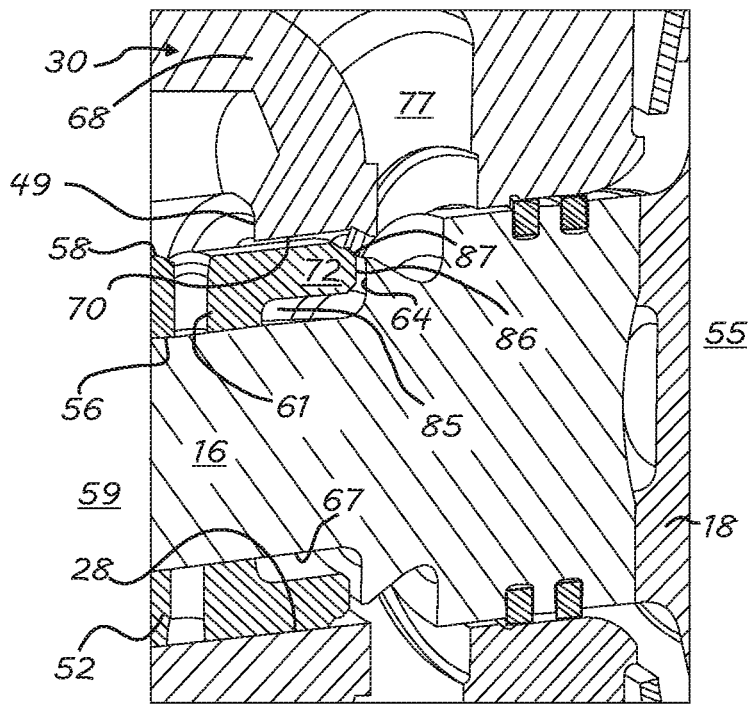
FIG. 2 is a detail fragmentary cross section illustration of an oil spray groove area of a product according to a number of variations.

With reference to FIG. 2, in a number of variations the bearing 52 may be positioned between the bearing housing 30 and the shaft 16. The bearing 52 may be received in the bearing bore 28 of the bearing housing 30 including at the support wall 68 in the wall opening 70. The through-hole 61 may provide an opening from the oil port 49 to the cylindrical opening 56. The shaft 16 may have the outer perimeter 67 over which the bearing 52 may be positioned. The segment 72 of the bearing 52 may extend into the wall opening 70, and may not extend completely there-through. A void 85 may be formed at the terminal end 86 (its turbine end outboard 55 end), of the bearing 52 between the segment 72 and the outer perimeter 67 of the shaft 16. The void 85 may be open to the chamber 77 past the shoulder 64. The segment 72 may include a chamfer 87 around its outer perimeter 58 at the terminal end 86.

Figure 3:
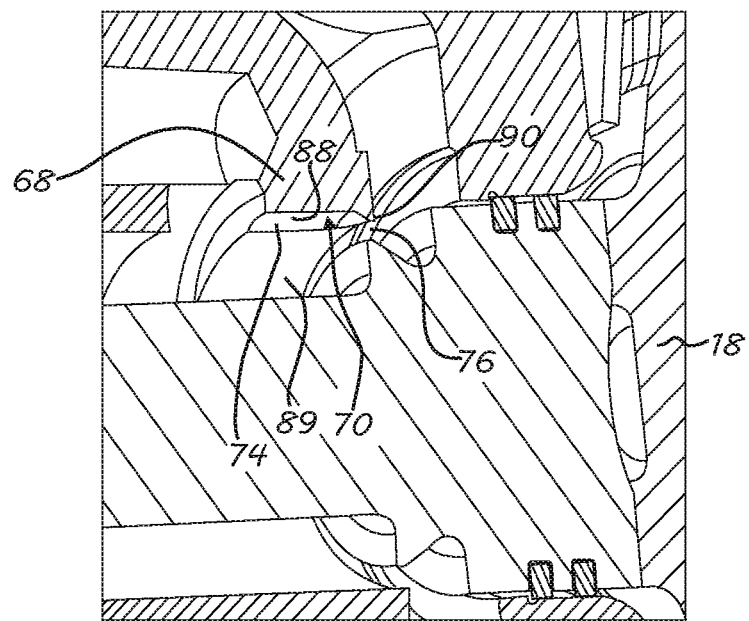
FIG. 3 is a detail fragmentary cross section illustration of an oil spray groove area of a product according to a number of variations.
Figure 4:
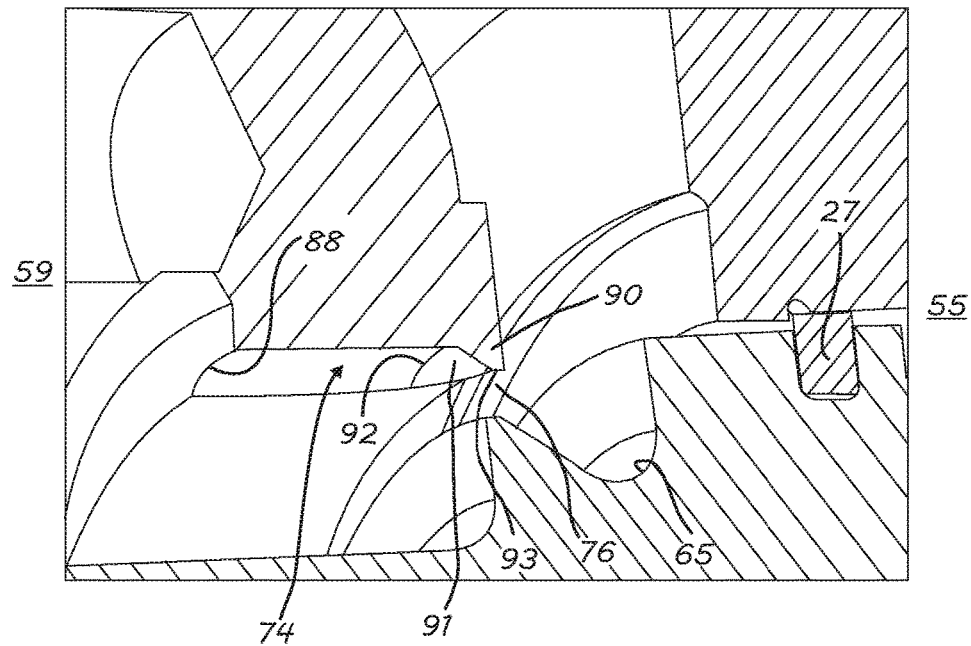
FIG. 4 is a detail fragmentary cross section illustration of an oil spray groove area of a product according to a number of variations.

Reference is directed to FIG. 3, which shows the area of the groove 74 with the bearing 52 removed for added visibility. The profile 88 of the groove 74 may be semi-circular in shape in a direction around the axis of rotation 11 and along the surface 89 of the support wall 68 at the wall opening 70. In the axial direction 11, the groove 74 may be formed to a depth into the surface 89 that is reduced toward and at the outlet 76 creating a point 90. Additionally referencing FIG. 4, the point 90 may be formed by a chamfered surface 91 that begins at its end 92 (on the turbine end inboard 59 side), with the profile 88 and ends at its end 93 (on the turbine end outboard 55 side), with the point 90. The point 90 may be a pointed shape in-that it may be narrower relative to the semi-circular profile 88. The chamfered surface 91 and the point 90 may direct oil flow through the groove 74 from the outlet 76 and into the trough 65. The result may include directing the oil flow to impinge upon the shaft 16 at locations other than at the seal rings 27, with an effect of increased cooling of the shaft 16 and minimized leakage past the seal rings 27.

Figure 5:
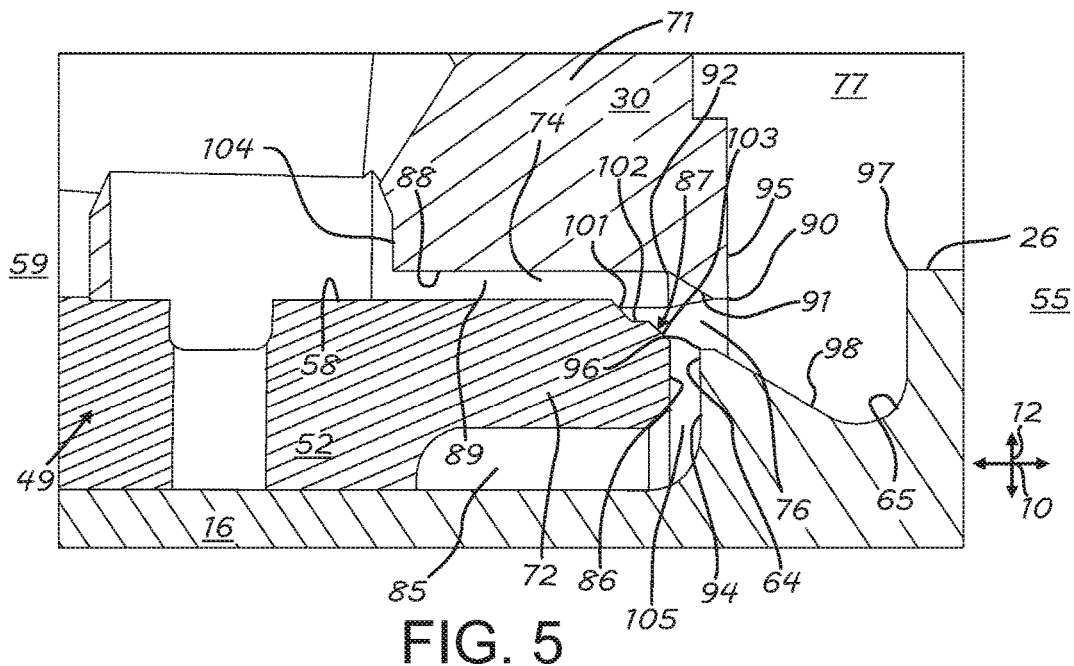
FIG. 5 is a detail fragmentary cross section illustration of an oil spray groove area of a product according to a number of variations.

With reference to FIG. 5, in a number of variations flow through the groove 74 and the direction of outflow may be tailored by the shape of groove 74 and the structure of the outlet 76. The structural shape of the shaft 16, the bearing housing 30 and the bearing assembly 53 may each contribute to the desirable effect on lubricant flow. Heat from the exhaust gas channeled around the turbine wheel 18 may have a tendency to transfer in the turbine end inboard 59 direction. Oil, used for lubrication and cooling in the bearing housing 30 may be desirably maintained on the turbine end inboard 59 side of the turbine wheel 18, while being employed most effectively. To achieve these goals, the shaft may include the shoulder 64 adjacent or near the enlarged segment 26. The shoulder 64 may be formed by a surface 94 that may extend from the shaft 16 outward in the radial direction 12. The surface 94 may be located inboard from the surface 95 of the support wall segment 71 facing the turbine wheel 18. In other words, the surface 94 may be positioned in the turbine end inboard 59 direction from the surface 95. The shoulder 64 may have a rim 96 that may be positioned inward in the radial direction 12 relative to the outer perimeter 58 of the bearing 52. On the turbine end outboard 55 side of the shoulder 64, the shaft 16 may include the trough 65. The trough 65 may be formed from the rim 96 to the end 97 of the enlarged segment 26 at its turbine end inboard 59 side. The angled surface 98 of the shaft 16 in the trough 65 may extend to the rim 96 in a direction targeted at the chamfer 87.

In a number of variations the bearing 52 may include the chamfer 87, which may be formed between the outer perimeter 58 and the terminal end 86, and may face the outlet 76. The chamfer 87 may include an inboard surface 101 adjacent the outer perimeter 58, an outboard surface 103 adjacent the terminal end 86 and an intermediate surface 102 between the inboard surface 101 and the outboard surface 103. The inboard surface 101 may be located on the turbine end inboard 59 side of the intermediate surface 102 and may face in a direction between outward in the radial direction 12 and outboard in the turbine end outboard 55 direction. The outboard surface 103 may be located on the turbine end outboard 55 side of the intermediate surface 102 and may face in a direction between outward in the radial direction 12 and outboard in the turbine end outboard 55 direction. The intermediate surface may face outward in the radial direction 12.

In a number of variations the bearing housing 30 may include the groove 74 which may have the profile 88 of the groove 74 with the semi-circular surface 89. The semi-circular surface 89 may extend from the surface 104 at the turbine end inboard 59 edge of the support wall segment 71 to the chamfered surface 91 at its end 92. The end 92 may be located at a position substantially in line with the terminal end 86 in the axial direction 10. The radially innermost edge of the point 90 may be located a distance from the axis of rotation 11 that is in line with the outer perimeter 58 of the bearing 52. The point 90 may be blunt and may face inward in the radial direction 12. As a result, oil outflow from the outlet 76 may primarily flow toward and into the trough 65 and may be dispersed in the chamber 77, and may partially flow into the void 85 through the space 105 between the terminal end 86 and the surface 94.

Through the foregoing structure a product such as a turbocharging system may include a turbine end structure that, during operation of the turbocharger, may decrease the effects of heat through tailored oil cooling, and may increase efficiency by reducing heat transfer from the turbine to the bearing housing and the compressor. The structure may be applied to existing applications of various types with minimal changes. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a housing that may be configured to house a bearing. A shaft may extend through the bearing. A turbine wheel may be connected to one end of the shaft. The housing may include a wall forming an opening and defining a surface facing the opening. The bearing may have a segment extending into the opening and mating with the surface. The wall may include an oil spray groove opening through the surface and having an outlet directed at the shaft Variation 2 may include the product according to variation 1 wherein the shaft may have an outer surface and may rotate about an axis. The shaft may include a shoulder adjacent the bearing, and may have a perimeter defined by the outer surface and encircling the axis. The shaft may define a trough around the perimeter that is annular in shape and into which the outlet is directed.

Variation 3 may include the product according to variation 2 wherein the wall may include a point at the outlet that may be formed at a terminal surface of the wall. The terminal surface may be disposed in a radial direction wherein the radial direction may be perpendicular to the axis.

Variation 4 may include the product according to any of variations 1-3 wherein the housing may include a second wall that may form a second opening and, may define a second surface facing the opening. The shaft may extend into the second opening and may be supported by the surface.

Variation 5 may include the product according to and of variations 1-4 wherein the housing may include an oil gallery that may be supplied with an oil and may include a channel that may be disposed alongside the bearing. The outlet may be open to the channel through the groove.

Variation 6 may include the product according to variation 5 wherein the groove may form an oil passage that may be contained by the housing and the bearing. The oil passage may be open to the channel and the outlet.

Variation 7 may include the product according to variation 5 wherein the housing may include an oil port adjacent the groove that may extend in the housing so that the oil flows through the oil port in a direction transverse to the channel.

Variation 8 may include the product according to any of variations 1-7 wherein the bearing may include a void that is annular in shape and that may be formed in the segment. The void may be open to the outlet.

Variation 9 may include the product according to variation 8 wherein the shaft may include a shoulder adjacent the bearing and wherein a space may be locate between the segment and the shoulder. The space may connect the void with the outlet.

Variation 10 may involve a product that may include a housing. A bearing may be disposed in the housing and may define a cylindrical opening. A shaft may extend through the cylindrical opening and may rotate about an axis defining an axial direction. A turbine wheel may be connected to one end of the shaft. The housing may include a support wall that may extend in the axial direction and that may turn inward toward the axis where it may form a wall opening. The bearing may have a segment that may extend into the wall opening. The wall may include a groove that may be open to the wall opening and may have an outlet that may be directed at the shaft.

Variation 11 may include the product according to variation 10 wherein the housing may include a turbine end wall that may be located between the support wall and the turbine wheel. The turbine end wall may form an axial opening. The shaft may include an enlarged segment that may be disposed in the axial opening and may be supported by the turbine end wall.

Variation 12 may include the product according to variation 10 or 11 wherein the housing may define a gallery system supplied with a lubricant. The gallery system may be open to the groove.

Variation 13 may include the product according to any of variations 10-12 wherein the shaft may have an outer surface and may include a shoulder adjacent the bearing. The shaft may have a perimeter that may be defined by the outer surface and may encircle the axis. The shaft may define a trough around the perimeter that may be annular in shape, may face the outlet, and into which the outlet may be directed.

Variation 14 may include the product according to any of variations 10-13 wherein the support wall may include a point at the outlet that may be formed at a terminal surface of the support wall. The terminal surface may be disposed in a radial direction, wherein the radial direction may be perpendicular to the axis.

Variation 15 may include the product according to any of variations 10-14 wherein the housing may include a turbine end wall positioned between the support wall and the turbine wheel. The housing may define a chamber between the support wall and the turbine end wall. The housing may define a channel of an oil gallery and a transverse opening connecting the channel with the cylindrical opening. The groove may provide an opening between the transverse opening and the chamber.

The above description of select variations within the scope of the invention is merely illustrative in nature and, thus, variations or variants thereof are not to be regarded as a departure from the spirit and scope of the invention.

What is claimed is:

1. A product comprising a housing configured to house a bearing; a shaft extending through the bearing; a turbine wheel connected to one end of the shaft; wherein the housing includes a wall forming an opening and defining a surface facing the opening, the bearing having a segment extending into the opening and mating with the surface; wherein the wall includes a groove opening through the surface and having an outlet directed at the shaft; and wherein a portion of the wall is chamfered toward and at the outlet forming a point at a terminal surface of the wall.

2. The product according to claim 1 wherein the shaft has an outer surface and a shoulder adjacent the bearing, and has a perimeter defined by the outer surface and encircling the axis; wherein the shaft defines a trough around the perimeter that is annular in shape and into which the outlet is directed.

3. The product according to claim 1 wherein the housing includes a second wall forming a second opening and defining a second surface facing the second opening, the shall extending into the second opening and supported by the second surface.

4. The product according to claim 1 wherein the housing includes an oil gallery that is supplied with an oil and includes a channel disposed alongside the bearing wherein the outlet is open to the channel through the groove.

5. The product according to claim 4 wherein the groove forms an oil passage that is contained by the housing and the bearing, and that is open to the channel and the outlet.

6. The product according to claim 4 wherein the housing includes an oil port adjacent the groove that extends in the housing so that the oil flows through the oil port in a direction transverse to the channel.

7. The product according to claim 1 wherein the bearing includes a void that is annular in shape and that is formed in the segment, the void open to the outlet.

8. The product according to claim 7 wherein the shaft includes a shoulder adjacent the bearing and wherein a space is located between the segment and the shoulder which connects the void with the outlet.

9. A product comprising a housing, a bearing disposed in the housing, wherein the bearing defines a cylindrical opening, a shaft extending through the cylindrical opening and rotating about an axis defining an axial direction, a turbine wheel connected to one end of the shaft, the housing includes a support wall that extends in the axial direction and forms a wall opening, the bearing having a segment extending into the wall opening, wherein the wall includes a groove open to the wall opening and having an outlet directed at the shaft; and wherein a portion of the support wall is chamfered toward and at the outlet forming a point at a terminal surface of the support wall.

10. The product according to claim 9 wherein the housing includes a turbine end wall located between the support wall and the turbine wheel, the turbine end wall forming an axial opening, the shaft including an enlarged segment disposed in the axial opening and supported by the turbine end wall.

11. The product according to claim 9 wherein the housing defines a gallery system supplied with a lubricant, the gallery system open to the groove.

12. The product according to claim 9 wherein the shaft has an outer surface and includes a shoulder adjacent the bearing, and the shaft has a perimeter defined by the outer surface and encircling the axis; wherein the shaft defines a trough around the perimeter that is annular in shape, faces the outlet, and into which the outlet is directed.

13. The product according to claim 9 wherein the housing includes a turbine end wall positioned between the support wall and the turbine wheel and the housing defines a chamber between the support wall and the turbine end wall, and wherein the housing defines a channel of an oil gallery and a transverse opening connecting the channel with the cylindrical opening, the groove providing an opening between the transverse opening and the chamber.

14. A product comprising:
   a housing, wherein the housing includes a cylindrical support wall that defines a bearing bore, and an oil gallery system defined within the housing, wherein the oil gallery system includes a channel defined within the housing disposed offset and parallel to the bearing bore, a first oil port and a second oil port defined within the housing each extending from the channel to the bearing bore;

at least one bearing disposed within the bearing bore;

a shaft extending through the at least one bearing constructed and arranged to rotate around an axis;

a turbine wheel connected to a first end of the shaft; and wherein the support wall includes a groove defined within a surface of the support wall, wherein the groove includes a first end open to the second oil port and a second end open to a chamber defined within the housing between the support wall and the turbine wheel, and wherein a depth of the groove is reduced toward and at the second end creating a point.

* * * * *